J. B. ROOT.
Pumps for Oil Wells.
No. 5,525. Reissued August 5, 1873.
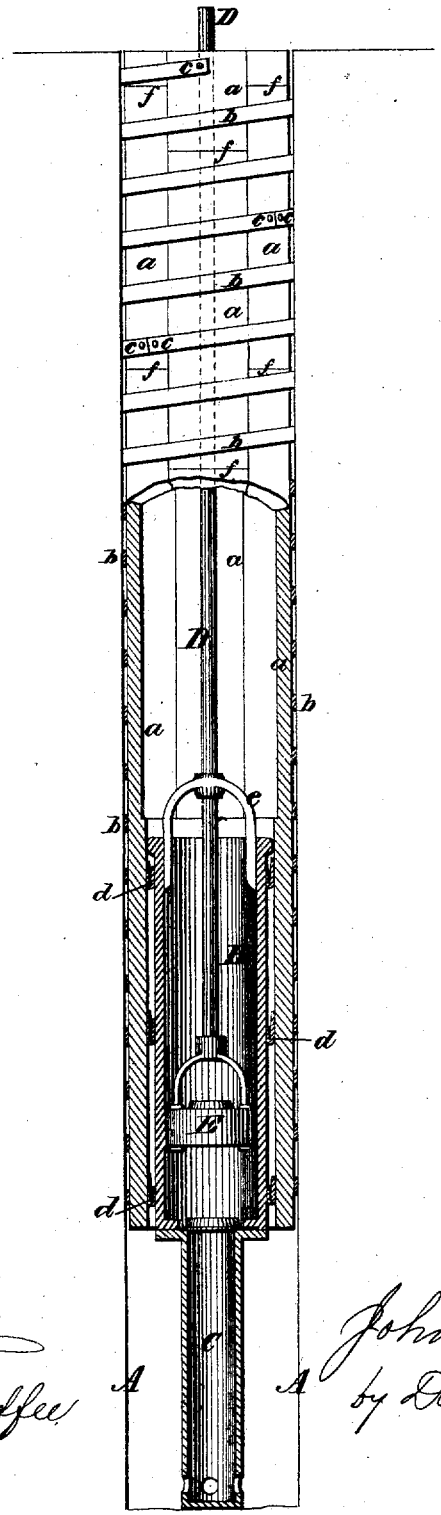
Witnesses.
Harry King.
Wm. E. Chaffee
Inventor.
John B. Root.
by Dodges & Son
Attys.
AM. PHOTO-LITHOGRAPHIC CO. N.Y. (OSBORNE'S PROCESS)

UNITED STATES PATENT OFFICE.

JOHN B. ROOT, OF NEW YORK, N. Y., ASSIGNOR, BY MESNE ASSIGNMENTS, TO ALEXANDER S. HILL, HARRISON H. NOYES, AND HARVEY M. HASKELL, OF PLEASANTVILLE, PENNSYLVANIA.

IMPROVEMENT IN PUMPS FOR OIL-WELLS.

Specification forming part of Letters Patent No. 47,224, dated April 11, 1865; reissue No. 5,525, dated August 5, 1873; application filed May 17, 1873.

*To all whom it may concern:*

Be it known that I, JOHN B. ROOT, of New York, in the county of New York and State of New York, have invented certain new and useful Improvements in Pumps for Oil-Wells; and I do hereby declare that the following is a full, clear, and exact description thereof, reference being had to the accompanying drawings making a part of this specification, and to the letters of reference marked thereon, like letters indicating like parts wherever they occur.

To enable others skilled in the art to construct and use my invention, I will proceed to describe it.

My invention relates to pumps for oil-wells; and it consists, first, of wooden tubing for the well, made of staves and bound around with iron bands or straps, this style of tubing being intended more especially for wells of large bore; and, secondly, my invention consists in so constructing and arranging the pump that it can be withdrawn from the well and replaced at will without removing the tubing; and, in this connection, my invention further consists in a novel method of packing or securing the pump-cylinder within the tubing, and in so connecting the pump-rod to the cylinder that it shall serve as the means of raising and lowering the same, while it also serves to work the pump, as hereinafter explained.

The drawing represents my invention, a portion being shown in section.

A represents the tubing of the well. *a a* are the wooden staves; and *b b*, the metal bands, of which the tubing is composed. The tubing is made in short lengths or sections by placing the staves together and putting a band or bands of hoop-iron around them. The bands might be in the form of hoops; but I prefer to make them of as great length as convenient, wind them spirally around the staves, as shown in the drawing, and nail them at the ends, as shown at *c c*. The several lengths are made so that in connecting with each other they will break joint, as shown at *f f*, and they are secured together by winding the bands around the joints and nailing one end of a band to one length, and the other end to the other length. In the shallow wells of large bore, for which this kind of tubing is more particularly intended, the oil and water are met with at nearly the same levels. The water is not commonly stopped off by a seed-bag but the pump is made to pump up both water and oil. The tubing is, or may be, therefore, made large enough to fit snugly into the bore, as represented, so that as large a pump as practicable may be used. The metal band may be sunk in a groove formed in the exterior of the staves. B is the pump-cylinder, having its exterior rather smaller than the interior of the tubing, and having provided around it and secured to it two or more rings or bands, *d d*, of leather or other suitable material, to form a water-tight packing between it and the lowest length of tubing.

In order that the pump may be raised and lowered easily for necessary repairs without disturbing the tubing, the interior of the lower length of tubing is made a little smaller than that of all the other lengths, so that the pump fitting it snugly may be capable of passing freely up and down to and from it.

The bottom of the pump-cylinder B is intended to stand at about the same level with the bottom of the tubing, which should not reach to the bottom of the bore, but leave the latter extended for same distance for the issue of the oil. The cylinder has firmly attached to its bottom the suction-pipe C, the bottom of which is intended to rest upon the bottom of the bore and support the pump at the proper height.

In order to provide for the drawing up of the pump from the tubing by means of its piston or plunger rod D, there is secured firmly to the top of the cylinder a yoke, *e*, through which the said rod passes. When it is desired to draw up the pump, the rod is drawn up, and, after the piston or plunger E has been brought into contact with the yoke, it brings up the pump-cylinder with it.

Having thus described my invention, what I claim is—

1. The pump-tube A, composed of wooden staves and surrounding bands of metal, constructed and arranged substantially as described.

2. In combination with a tube for oil-wells, the detachable pump-cylinder, arranged to operate substantially as described, whereby the latter can be withdrawn and replaced without removing the tubing of the well, as and for the purposes set forth.

3. The combination of the tube A, cylinder B, and packing-rings *d*, substantially as described.

4. The piston or valve rod D, connected to the pump-cylinder B, substantially as described, whereby the rod has sufficient motion to operate the pump and when drawn up will remove the cylinder with it, as herein set forth.

JOHN B. ROOT.

Witnesses:

H. L. WATTENBERG,

G. M. PLYMPTON.